(12) United States Patent
Harada

(10) Patent No.: US 10,229,792 B2
(45) Date of Patent: Mar. 12, 2019

(54) SOLID ELECTROLYTIC CAPACITOR ELEMENT, SOLID ELECTROLYTIC CAPACITOR, METHOD FOR PRODUCING SOLID ELECTROLYTIC CAPACITOR ELEMENT, AND METHOD FOR PRODUCING SOLID CAPACITOR

(71) Applicant: Murata Manufacturing Co., Ltd., Nagaokakyo-shi, Kyoto-fu (JP)

(72) Inventor: Hiroyuki Harada, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 0 days.

(21) Appl. No.: 15/681,707

(22) Filed: Aug. 21, 2017

(65) Prior Publication Data

US 2018/0061584 A1   Mar. 1, 2018

(30) Foreign Application Priority Data

Aug. 25, 2016 (JP) .................................. 2016-164735

(51) Int. Cl.
| | |
|---|---|
| *H01G 9/15* | (2006.01) |
| *H01G 9/00* | (2006.01) |
| *H01G 9/025* | (2006.01) |
| *H01G 9/042* | (2006.01) |
| *H01G 9/012* | (2006.01) |
| *H01G 9/10* | (2006.01) |

(52) U.S. Cl.
CPC ............. *H01G 9/15* (2013.01); *H01G 9/0003* (2013.01); *H01G 9/0036* (2013.01); *H01G 9/012* (2013.01); *H01G 9/025* (2013.01); *H01G 9/0425* (2013.01); *H01G 9/10* (2013.01); *H01G 2009/0014* (2013.01)

(58) Field of Classification Search
CPC ........ H01G 9/15; H01G 9/0036; H01G 9/025; H01G 9/0425; H01G 2009/0014
See application file for complete search history.

(56) References Cited

U.S. PATENT DOCUMENTS

| | | | |
|---|---|---|---|
| 6,771,488 B2 * | 8/2004 | Takagi ................. | H01G 9/012 361/509 |
| 6,775,126 B2 | 8/2004 | Fujii et al. | |
| 8,014,129 B2 | 9/2011 | Saito et al. | |
| 8,379,369 B2 * | 2/2013 | Fukunaga ............ | H01G 9/0032 29/25.03 |
| 8,437,117 B2 * | 5/2013 | Umemoto ............. | H01G 9/012 361/528 |

(Continued)

FOREIGN PATENT DOCUMENTS

| | | |
|---|---|---|
| CN | 1499548 A | 5/2004 |
| JP | 2009158692 A | 7/2009 |

*Primary Examiner* — Dion Ferguson
(74) *Attorney, Agent, or Firm* — Arent Fox LLP

(57) ABSTRACT

A solid electrolytic capacitor element that includes a valve metal substrate that has an anode terminal region and a cathode-forming region; a dielectric layer on the cathode-forming region; a solid electrolyte layer on the dielectric layer; a current collector layer on the solid electrolyte layer; a masking member on the anode terminal region, the masking member partitioning between the anode terminal region and the cathode-forming region and insulating the valve metal substrate from opposite polarity; and a hydrophilic member on a surface of the masking member.

20 Claims, 4 Drawing Sheets

(56) References Cited

U.S. PATENT DOCUMENTS

| | | | |
|---|---|---|---|
| 8,625,254 B2* | 1/2014 | Takahashi | H01G 9/0036 |
| | | | 361/523 |
| 9,236,193 B2* | 1/2016 | Tatsuno | H01G 9/0003 |
| 2002/0167786 A1* | 11/2002 | Sano | H01G 9/012 |
| | | | 361/509 |
| 2004/0130856 A1 | 7/2004 | Fujii et al. | |
| 2006/0084237 A1* | 4/2006 | Kobayashi | H01G 9/028 |
| | | | 438/381 |
| 2009/0168304 A1 | 7/2009 | Saito et al. | |
| 2009/0316338 A1* | 12/2009 | Park | H01G 9/012 |
| | | | 361/534 |
| 2010/0103589 A1* | 4/2010 | Fukunaga | H01G 9/0032 |
| | | | 361/524 |
| 2010/0136222 A1* | 6/2010 | Furukawa | H01G 9/0036 |
| | | | 427/80 |
| 2011/0026190 A1* | 2/2011 | Oohata | H01G 9/10 |
| | | | 361/523 |
| 2015/0155101 A1* | 6/2015 | Araki | H01G 9/0029 |
| | | | 205/80 |

* cited by examiner

SOLID ELECTROLYTIC CAPACITOR ELEMENT, SOLID ELECTROLYTIC CAPACITOR, METHOD FOR PRODUCING SOLID ELECTROLYTIC CAPACITOR ELEMENT, AND METHOD FOR PRODUCING SOLID CAPACITOR

CROSS REFERENCE TO RELATED APPLICATIONS

The present application claims priority to Japanese Patent Application No. 2016-164735, filed Aug. 25, 2016, the entire contents of which are incorporated herein by reference.

BACKGROUND OF THE INVENTION

Field of the Invention

The present invention relates to a solid electrolytic capacitor element, a solid electrolytic capacitor, a method for producing a solid electrolytic capacitor element, and a method for producing a solid electrolytic capacitor.

Description of the Related Art

A solid electrolytic capacitor includes, for example, a solid electrolytic capacitor element prepared by forming an oxide coating film that constitutes a dielectric layer on a roughened surface of a valve metal substrate, forming a masking layer to separate an anode portion and a cathode portion from each other, and sequentially forming, on the dielectric layer outside the anode portion, a solid electrolyte layer, and a carbon paste layer and a silver paste layer that constitute a current collector layer as described in Japanese Unexamined Patent Application Publication No. 2009-158692, for example.

However, typical solid electrolytic capacitors such as one disclosed in Japanese Unexamined Patent Application Publication No. 2009-158692 sometimes have an issue of large leak current.

FIGS. 7A and 7B are schematic cross-sectional views of an example of a solid electrolytic capacitor element included in a typical solid electrolytic capacitor.

A solid electrolyte layer 40 and a current collector layer 50 constituting a typical solid electrolytic capacitor element 6 are typically each prepared by immersing one end portion of a valve metal substrate 10, where a cathode portion will be formed, in a raw material solution or dispersion of a conductive polymer, carbon paste, or the like.

However, when the valve metal substrate 10 is immersed in the raw material solution or dispersion of a conductive polymer for forming a solid electrolyte layer 40, a masking layer 35 repels the raw material solution or dispersion. As illustrated in FIG. 7A, this sometimes results in formation of a gap between the masking layer 35 and the solid electrolyte layer 40.

When carbon paste or the like is applied to the solid electrolyte layer 40 under such conditions so as to form a current collector layer 50, carbon paste penetrates the gap, and, as illustrated in FIG. 7B, the current collector layer 50 comes into contact with a dielectric layer 20. It is considered that the leak current will increase as a result.

SUMMARY OF THE INVENTION

The present invention has been made to address the aforementioned issues. An object of the present invention is to provide a solid electrolytic capacitor element with which leak current is suppressed.

Preferred embodiments of the present invention provide a solid electrolytic capacitor element that includes a valve metal substrate that has an anode terminal region and a cathode-forming region; a dielectric layer on the cathode-forming region; a solid electrolyte layer on the dielectric layer; a current collector layer on the solid electrolyte layer; a masking member partitioning between the anode terminal region and the cathode-forming region and insulating the valve metal substrate from opposite polarity; and a hydrophilic member on a surface of the masking member.

As illustrated in FIG. 1 described below, in the solid electrolytic capacitor element according to preferred embodiments of the present invention, a hydrophilic region 31a that includes a hydrophilic member 31 is formed on the surface of a masking member 30. Thus, the raw material solution or dispersion of the conductive polymer for forming the solid electrolyte layer 40 is easily retained on the hydrophilic region 31a. Thus, a gap, such as one illustrated in FIG. 7A, is not formed between the masking region 30a and the solid electrolyte layer 40. It is considered that due to this feature, leak current is suppressed.

Preferably, the hydrophilic member contains at least one selected from the group consisting of a silane coupling agent, a metal chelating agent, and a wetting agent.

The silane coupling agent, the metal chelating agent, and the wetting agent can all impart sufficient hydrophilicity to the masking member.

Preferably, the silane coupling agent is at least one selected from the group consisting of 3-glycidyloxypropyltrimethoxysilane and 3-aminopropyltrimethoxysilane.

These silane coupling agents can impart sufficient hydrophilicity to the surface of the masking member.

Preferably, the metal chelating agent is at least one selected from the group consisting of 8-quinolinol, 1,2,3-benzotriazole, and 1,3-diphenyl-1,3-propanedione.

These metal chelating agents can impart sufficient hydrophilicity to the surface of the masking member.

Preferably, at least a portion of the solid electrolyte layer is formed on the hydrophilic member and is not covered with the current collector layer, and thereby exposed.

When the solid electrolyte layer formed on the hydrophilic member is at least partly left uncovered with the current collector layer and exposed, the current collector layer and the dielectric layer are prevented from coming into direct contact with each other in the exposed region.

Preferably, an entirety of the solid electrolyte layer formed on the dielectric layer and within the cathode-forming region is covered with the current collector layer.

When the entirety of the solid electrolyte layer formed on the dielectric layer and within the cathode-forming region is covered with the current collector layer, the electron spin resonance (ESR) of the solid electrolytic capacitor element can be sufficiently decreased.

Preferably, the masking member has a height of about 50 μm or less. When the masking member has a height exceeding about 50 μm, the capacitor element is excessively large and the capacitance per volume may decrease.

Preferred embodiments of the present invention also provide a solid electrolytic capacitor that includes the solid electrolytic capacitor element described above, and a packaging resin that seals the solid electrolytic capacitor element.

Preferred embodiments of the present invention further provide a method for producing a solid electrolytic capacitor element. The method includes a step of forming a dielectric layer on surfaces of a valve metal substrate; a step of forming a masking member on the valve metal substrate so as to partition the valve metal substrate into an anode terminal region and a cathode-forming region; a step of forming a hydrophilic member on a surface of the masking member; a step of forming a solid electrolyte layer on part of the hydrophilic member and on the dielectric layer; and a step of forming a current collector layer on the solid electrolyte layer.

According to this method, since a hydrophilic member is formed on a surface of the masking member, a raw material solution or dispersion of a conductive polymer for forming the solid electrolyte layer is easily retained on the hydrophilic member. Thus, no gap is formed between the masking member and the solid electrolyte layer. As a result, a solid electrolytic capacitor element with less leak current can be produced.

Other features, elements, characteristics and advantages of the present invention will become more apparent from the following detailed description of preferred embodiments of the present invention with reference to the attached drawings.

DETAILED DESCRIPTION OF THE PREFERRED EMBODIMENTS

A solid electrolytic capacitor element and a solid electrolytic capacitor according to preferred embodiments of the present invention will now be described.

It is to be noted that the present invention is not limited to the structures described below and is subject to various modifications and alterations without departing from the gist of the invention. Any combination of two or more preferable structures of the present invention described below is also within the scope of the present invention.

Solid Electrolytic Capacitor Element

First, a solid electrolytic capacitor element according to preferred embodiments of the present invention is described.

A solid electrolytic capacitor element according to preferred embodiments of the present invention includes a valve metal substrate that has an anode terminal region and a cathode-forming region; a dielectric layer formed on the cathode-forming region; a solid electrolyte layer formed on the dielectric layer; a current collector layer formed on the solid electrolyte layer; and a masking region formed on the anode terminal region to insulate the valve metal substrate from opposite polarity.

Figure 1:
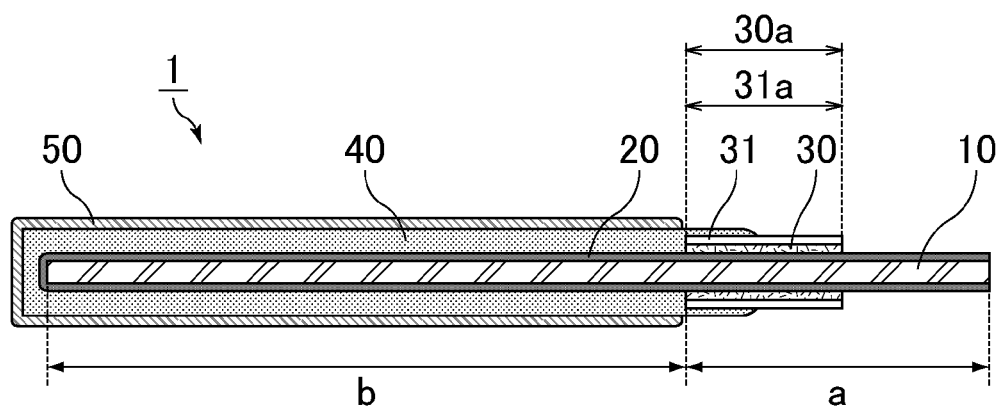
FIG. 1 is a schematic cross-sectional view of an example of a solid electrolytic capacitor element according to preferred embodiments of the present invention.
Figure 2:
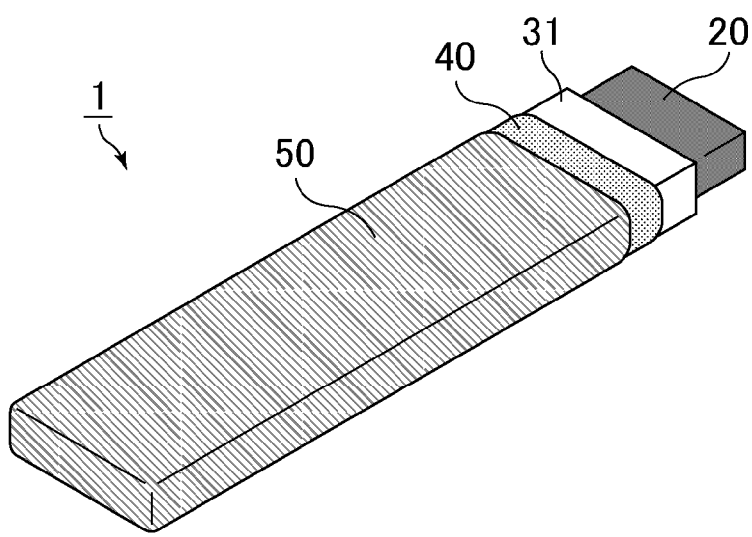
FIG. 2 is a perspective view of a solid electrolytic capacitor element 1 illustrated in FIG. 1.

FIG. 1 is a schematic cross-sectional view of an example of a solid electrolytic capacitor element according to preferred embodiments of the present invention. FIG. 2 is a perspective view of a solid electrolytic capacitor element 1 illustrated in FIG. 1.

A solid electrolytic capacitor element 1 illustrated in FIGS. 1 and 2 includes a valve metal substrate 10 having an anode terminal region (a region indicated by double-headed arrow a in FIG. 1) and a cathode-forming region (a region indicated by double-headed arrow b in FIG. 1); a dielectric layer 20 formed on the anode terminal region a and the cathode-forming region b; a solid electrolyte layer 40 formed on the dielectric layer 20; and a current collector layer 50 formed on the solid electrolyte layer 40.

A masking region 30a that includes a masking member 30 is formed on the anode terminal region a. The masking region 30a is provided to partition between the anode terminal region a and the cathode-forming region b and insulate the valve metal substrate 10 from opposite polarity. A hydrophilic region 31a that includes a hydrophilic member 31 is formed on the entire surfaces of the masking member 30 that constitutes the masking region 30a. The solid electrolyte layer 40 covers at least part of the hydrophilic region 31a. In FIG. 1, because the hydrophilic member 31 is formed on the entire masking member 30 constituting the masking region 30a, the masking region 30a and the hydrophilic region 31a are coincident.

In the solid electrolytic capacitor element according to preferred embodiments of the present invention, as illustrated in FIG. 2, the masking region is preferably provided on and around surfaces of the valve metal substrate or surfaces of the dielectric layer formed on the valve metal substrate. More preferably, the masking region is provided all around in a direction substantially orthogonal to a long axis direction of the valve metal substrate (hereinafter this direction may be referred to as a circumferential direction of the valve metal substrate). Similarly, the hydrophilic region is also formed on and around the surfaces of the masking region and more preferably provided all around in the circumferential direction of the valve metal substrate.

The width of the hydrophilic region (the length indicated by double-headed arrow 31a in FIG. 1) is either the same as the width of the masking region (the length indicated by double-headed arrow 30a in FIG. 1) or smaller than the width of the masking region.

The position of the hydrophilic region in the masking region is not particularly limited. From the viewpoint of preventing formation of the gap illustrated in FIG. 7A, the hydrophilic region is preferably formed at a position in the masking region close to the cathode-forming region. More preferably, the hydrophilic region is formed at an cathode-forming-region-side end portion.

Figure 3:
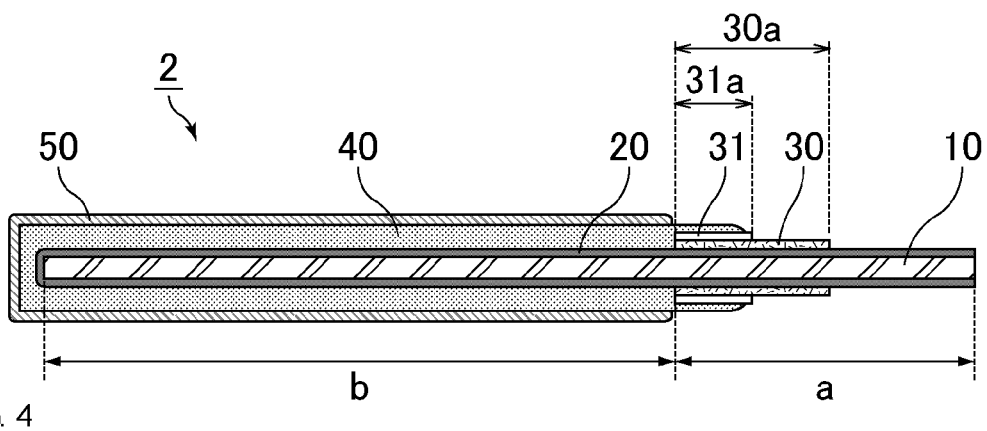
FIG. 3 is a schematic cross-sectional view of another example of a solid electrolytic capacitor element according to preferred embodiments of the present invention.

FIG. 3 is a schematic cross-sectional view of another example of a solid electrolytic capacitor element according to preferred embodiments of the present invention.

In a solid electrolytic capacitor element 2 illustrated in FIG. 3, among the masking region 30a, the cathode-forming region b-side end portion is provided with the hydrophilic region 31a that includes the hydrophilic member 31. The anode terminal region a-side end portion is not provided with the hydrophilic region 31a.

Figure 4:
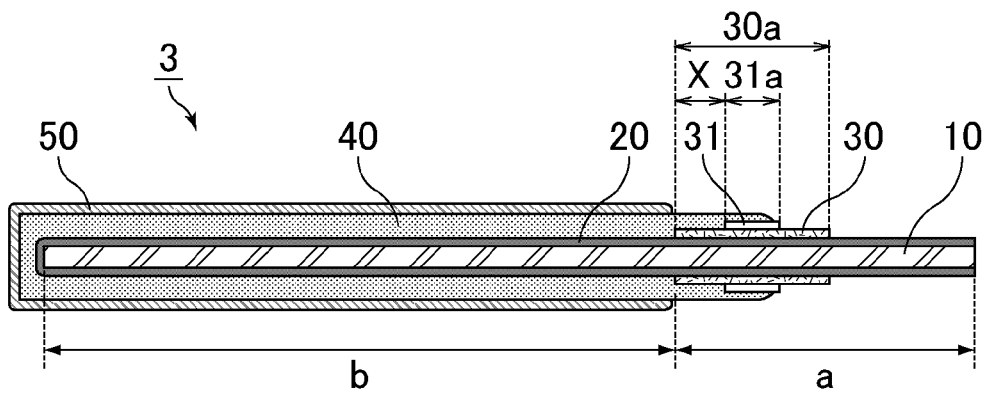
FIG. 4 is a schematic cross-sectional view of yet another example of the solid electrolytic capacitor element according to preferred embodiments of the present invention.

FIG. 4 is a schematic cross-sectional view of another example of the solid electrolytic capacitor element according to preferred embodiments of the present invention.

Figure 7A:
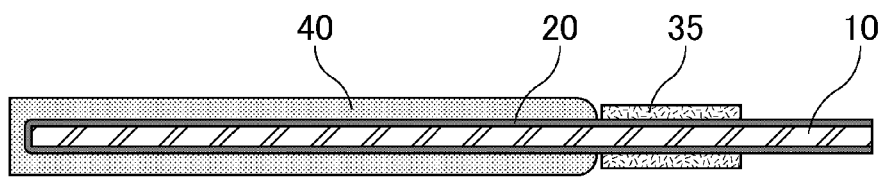
FIGS. 7A and 7B are schematic cross-sectional views of an example of a solid electrolytic capacitor element included in a solid electrolytic capacitor according to a related art.
Figure 7B:
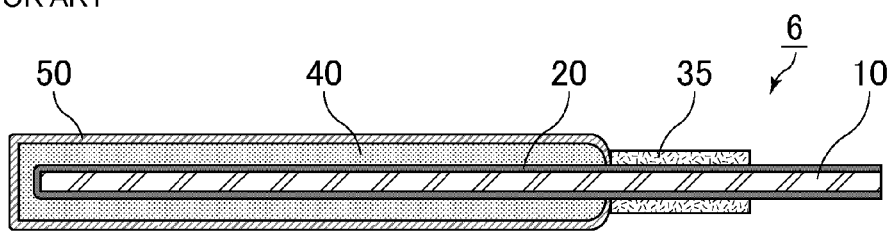

In a solid electrolytic capacitor element 3 illustrated in FIG. 4, a hydrophilic region 31a is formed in the masking region 30a so as to divide the masking region 30a into two parts. Even when the hydrophilic region 31a is not formed at the cathode-forming region b-side end portion, the raw material solution or dispersion of the conductive polymer for forming the solid electrolyte layer 40 is easily retained on the hydrophilic region 31a. Thus, the solid electrolyte layer 40 is formed also on the cathode-forming region b-side end portion (the region indicated by double-headed arrow X in FIG. 4) in the masking region 30a, and a gap such as one shown in FIG. 7A is rarely formed.

In the solid electrolytic capacitor element according to preferred embodiments of the present invention, the height of the masking member constituting the masking region is not particularly limited but is preferably about 50 μm or less.

For the purposes of the specification, the height of the masking member refers to a height from a surface of a dielectric layer on which the masking member is formed to a surface of the masking member. When the surfaces of the valve metal substrate have a porous layer, the penetration depth of the masking member penetrating the interior of the porous layer is excluded from the height of the masking member.

Examples of the material for the masking member of the solid electrolytic capacitor element according to preferred embodiments of the present invention include insulating resins such as polyphenylsulfone resins, polyether sulfone resins, cyanate ester resins, fluororesins (tetrafluoroethylene, tetrafluoroethylene-perfluoroalkyl vinyl ether copolymers, etc.), polyimide resins, polyamide imide resins, and derivatives, precursors, etc., of these resins.

Examples of the hydrophilic member provided on the surface of the masking member of the solid electrolytic capacitor element according to preferred embodiments of the present invention include a silane coupling agent, a metal chelating agent, and a wetting agent. These can be used alone or in combination. Among these, at least one selected from the group consisting of a silane coupling agent, a metal chelating agent, and a wetting agent is preferable.

Examples of the silane coupling agent include 3-glycidyloxypropyltrimethoxysilane and 3-aminopropyltrimethoxysilane. These can be used alone or in combination. Among these, at least one selected from the group consisting of 3-glycidyloxypropyltrimethoxysilane and 3-aminopropyltrimethoxysilane is preferable.

Examples of the metal chelating agent include 8-quinolinol, 1,2,3-benzotriazole, and 1,3-diphenyl-1,3-propanedione. These can be used alone or in combination. Among these, at least one selected from the group consisting of 8-quinolinol, 1,2,3-benzotriazole, and 1,3-diphenyl-1,3-propanedione is preferable.

Examples of the wetting agent include ethoxylate nonionic surfactants (for example, Carbowet series produced by Air Products and Chemicals, Inc.), acetylene glycol surfactants (for example, Surfynol series produced by Air Products and Chemicals, Inc.), and alkane diol surfactants (for example, EnviroGem series produced by Air Products and Chemicals, Inc.).

In the solid electrolytic capacitor element according to preferred embodiments of the present invention, a hydrophobic region that includes a hydrophobic member may be formed on a surface of the masking member that constitutes the region on the anode terminal region side of the hydrophilic region among the masking region. Examples of the hydrophobic member include epoxy resins, polyimide resins, polyester resins, and silicone.

When a hydrophobic region is formed in the region on the anode terminal region side of the hydrophilic region, the hydrophilic region easily retains the raw material solution or dispersion of the conductive polymer for forming the solid electrolyte layer 40 while the hydrophobic region does not. Thus, the region in which the solid electrolyte layer is formed can be adjusted.

The valve metal substrate, the dielectric layer, the solid electrolyte layer, and the current collector layer that constitute the solid electrolytic capacitor element according to preferred embodiments of the present invention will now be described.

The valve metal substrate of the solid electrolytic capacitor element according to preferred embodiments of the present invention is formed of a valve metal that has a valve action. Examples of the valve metal include single element metals such as aluminum, tantalum, niobium, titanium, and zirconium, and alloys that contain these metals. Among these, aluminum and aluminum alloys are preferable.

In the solid electrolytic capacitor element according to preferred embodiments of the present invention, the valve metal substrate preferably has a flat-plate shape and more preferably has a foil shape. The surfaces of the valve metal substrate are preferably provided with a porous layer such as an etching layer. When the valve metal substrate has a porous layer, the surface area of the valve metal substrate that functions as an anode is increased, and thus the capacitance of the capacitor can be increased.

In the solid electrolytic capacitor element according to preferred embodiments of the present invention, the dielectric layer preferably includes an oxide coating film formed of the valve metal. For example, when an aluminum foil is used as the valve metal substrate, an oxide coating film can be formed by oxidizing the aluminum foil in an aqueous solution that contains boric acid, phosphoric acid, adipic acid, or a sodium or ammonium salt thereof, for example.

In the solid electrolytic capacitor element according to preferred embodiments of the present invention, the solid electrolyte layer is formed in the entirety of the first covered region and at least part of the exposed region among the masking region. The solid electrolyte layer may be formed over the entire exposed region and may be formed in part of the second covered region. The solid electrolyte layer is also formed on the dielectric layer on the cathode-forming region.

In the solid electrolytic capacitor element according to preferred embodiments of the present invention, the solid electrolyte layer formed on the masking region is preferably at least partly left uncovered with the current collector layer and exposed.

In the solid electrolytic capacitor element according to preferred embodiments of the present invention, the entirety of the solid electrolyte layer formed on the dielectric layer on the cathode-forming region is preferably covered with the current collector layer.

When the valve metal substrate has a porous layer, the solid electrolyte layer preferably includes an inner layer penetrating the porous layer of the valve metal substrate, and an outer layer that covers an outer portion of the inner layer. The inner layer and the outer layer may have the same composition or different compositions.

Examples of the material that constitutes the solid electrolyte layer include conductive polymers having pyrrole, thiophene, or aniline skeletons. Example of the conductive polymer that has a thiophene skeleton include poly(3,4-ethylenedioxythiophene) (PEDOT). PEDOT may be combined with a dopant, polystyrene sulfonic acid (PSS) to form poly(3,4-ethylenedioxythiophene) polystyrene sulfonate (PEDOT:PSS).

In the solid electrolytic capacitor element according to preferred embodiments of the present invention, the current collector layer formed on the solid electrolyte layer preferably includes a carbon layer, which functions as a base layer, and a silver layer on the carbon layer. The current collector layer may include a carbon layer only or a silver layer only.

Method for Producing Solid Electrolytic Capacitor Element

A method for producing a solid electrolytic capacitor element according to preferred embodiments of the present invention will now be described.

The method for producing a solid electrolytic capacitor element according to preferred embodiments of the present invention includes a step of forming a dielectric layer on surfaces of a valve metal substrate; a step of forming a masking region that includes a masking member on the valve metal substrate so as to partition the valve metal substrate into an anode terminal region and a cathode-forming region; a step of forming a solid electrolyte layer on part of the masking region and on the dielectric layer; and a step of forming a current collector layer on the solid electrolyte layer. In the step of forming a masking region, a hydrophilic region that includes a hydrophilic member is formed on a surface of the masking member.

FIGS. 5A to 5D are schematic cross-sectional views of an example of the method for producing a solid electrolytic capacitor element according to preferred embodiments of the present invention.

An example of the method for producing a solid electrolytic capacitor element according to preferred embodiments of the present invention is described below with reference to FIGS. 5A to 5D.

Figure 5A:
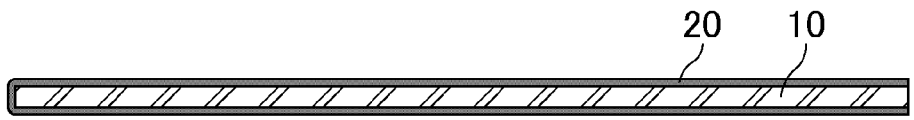
FIGS. 5A to 5D are schematic cross-sectional views illustrating one example of a method for forming a solid electrolytic capacitor element according to preferred embodiments of the present invention.

First, as illustrated in FIG. 5A, a dielectric layer 20 is formed on surfaces of a valve metal substrate 10. For example, a dielectric layer formed of an oxide coating film can be formed by anodizing (also known as chemical conversion) surfaces of the valve metal substrate, such as an aluminum foil, in an ammonium adipate aqueous solution.

Figure 5B:
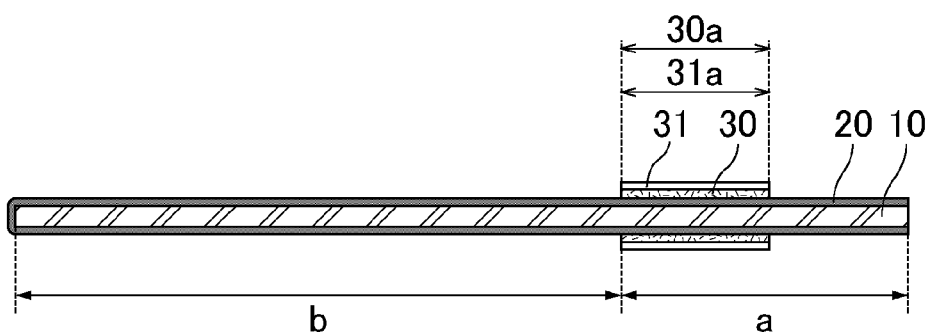

Next, as illustrated in FIG. 5B, a masking region 30a that includes a masking member 30 is formed on the valve metal substrate 10 to partition between an anode terminal region and a cathode-forming region. Then a hydrophilic region 31a that includes a hydrophilic member 31 is formed on the surface of the masking member 30.

For the purposes of the present invention, the portion where the masking region 30a is formed is assumed to be the anode terminal region. At this stage, the portion where the masking region 30a is not formed can become either an anode terminal region or a cathode-forming region.

However, typically, a large-area portion is assumed to be the cathode-forming region, and a small-area portion is assumed to be the anode terminal region. In the description below, the region (indicated by double-headed arrow a in FIG. 5B) that includes the masking region 30a and the region on the right side of the masking region 30a in FIG. 5B is assumed to be the anode terminal region, and a region (indicated by double-headed arrow b in FIG. 5B) on the left side of the masking region 30a is assumed to be the cathode-forming region.

The method for forming a masking region on the anode terminal region is not particularly limited. For example, an insulating resin that functions as a masking member may be applied to the anode terminal region, heated as needed, and dried.

Examples of the technique for applying the insulating resin include an inkjet technique, a screen printing technique, a dispenser technique, a transfer technique, and other known techniques.

The technique for forming a hydrophilic region on the surface of the masking member is not particularly limited. For example, a silane coupling agent or the like that functions as a hydrophilic member may be applied to the surface of the masking member, and if needed, heated, and dried.

Examples of the technique of applying the silane coupling agent or the like include an inkjet technique, a screen printing technique, a dispenser technique, a transfer technique, and other known techniques.

There is no need to form the dielectric layer over the entire surfaces of the valve metal substrate as long as the dielectric layer is formed on the cathode-forming region of the valve metal substrate. As long as the dielectric layer is formed in this region, the order in which the step of forming a dielectric layer on surfaces of the valve metal substrate and the step of forming a masking region are performed is not particularly limited. In other words, the masking region may be formed after the dielectric layer is formed on surfaces of the valve metal substrate. Alternatively, the dielectric layer may be formed after the masking region is formed on surfaces of the valve metal substrate. The order in which a hydrophilic region is formed on the surface of the masking member is also not particularly limited.

A chemically converted foil preliminarily subjected to a chemical conversion treatment may be used as the valve metal substrate. When a chemically converted foil is used, the foil needs to be cut into a particular shape before actual use; thus, cut ends that do not have the oxide coating film are exposed. Thus, even when a chemically converted foil is used, a treatment known as "cut end chemical conversion" that involves forming an oxide coating film on surfaces of the valve metal substrate including the cut ends needs to be performed. The cut end chemical conversion is also included in the step of forming a dielectric layer on surfaces of the valve metal substrate according to preferred embodiments of the present invention.

Figure 5C:
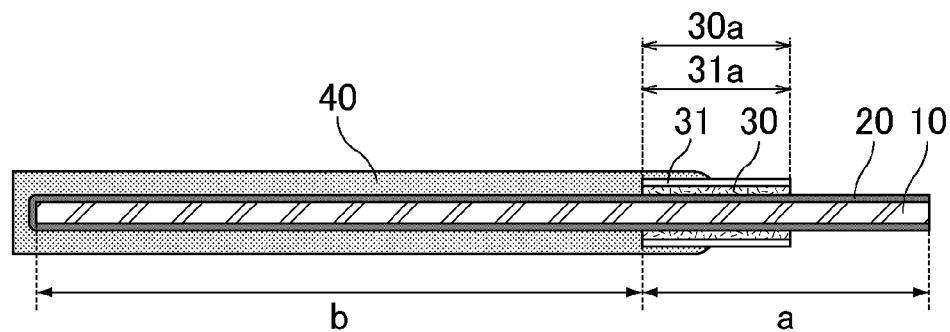

Next, as illustrated in FIG. 5C, a solid electrolyte layer 40 is formed so as to cover the entirety of the dielectric layer 20 in the cathode-forming region, and, among the masking region 30a, at least part of the hydrophilic region 31a where the hydrophilic member 31 is provided.

Examples of the method for forming the solid electrolyte layer include a method that involves providing a dispersion (also known as a conductive polymer solution), which contains a conductive polymer dispersed therein, to the dielectric layer, and drying the solution; and a method that involves providing a solution (also known as a conductive monomer solution), which contains a monomer that forms a conductive polymer, to the dielectric layer, and inducing polymerization.

The technique of providing the conductive polymer solution or the conductive monomer solution to the dielectric layer is not particularly limited. Examples of the technique include a technique of applying a conductive polymer solution or a conductive monomer solution to the dielectric layer, and a technique of immersing a cathode-forming-region-side end portion of a valve metal substrate, which has a dielectric layer and a masking region formed on surfaces thereof, in a conductive polymer solution or a conductive monomer solution down to a particular depth.

For example, in FIG. 5C, when the portion that includes the cathode-forming region b-side end portion of the valve metal substrate 10 and up to half of the masking region 30a is immersed in the conductive polymer solution or a conductive monomer solution, the hydrophilic member 31 that constitutes the hydrophilic region 31a retains the conductive polymer solution or the conductive monomer solution. As a result, the gap illustrated in FIG. 7A is not formed between the masking region 30a and the solid electrolyte layer 40.

Figure 5D:
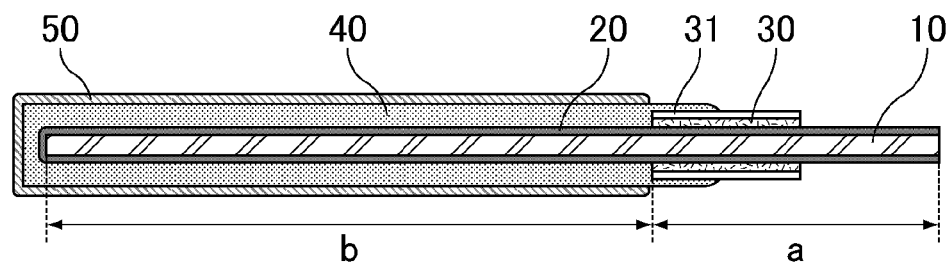

Then, as illustrated in FIG. 5D, a current collector layer 50 is formed on the solid electrolyte layer 40. In FIG. 5D, the current collector layer 50 is formed only on the cathode-forming region b.

In the method for producing a solid electrolytic capacitor element according to preferred embodiments of the present invention, the collector layer may be formed on the solid electrolyte layer on the anode terminal region; however, the solid electrolyte layer on the masking region is preferably at least partly left uncovered with the current collector layer and exposed.

In the method for producing a solid electrolytic capacitor element according to preferred embodiments of the present invention, the entirety of the solid electrolyte layer formed on the dielectric layer on the cathode-forming region is preferably covered with the current collector layer.

The height of the masking member, the material for the masking member and the like are the same as those described in the section "Solid electrolytic capacitor element".

In the method for producing a solid electrolytic capacitor element according to preferred embodiments of the present invention, a hydrophobic region that includes a hydrophobic member may be formed on the surface of the masking member that constitutes a region close to the anode terminal region than the hydrophilic region among the masking region.

Solid Electrolytic Capacitor

A solid electrolytic capacitor according to preferred embodiments of the present invention will now be described.

The solid electrolytic capacitor according to preferred embodiments of the present invention includes the solid electrolytic capacitor element described in the section "Solid electrolytic capacitor element". The solid electrolytic capacitor element is sealed with a packaging resin. When the solid electrolytic capacitor according to preferred embodiments of the present invention includes two or more solid electrolytic capacitor elements, solid electrolytic capacitor elements other than the solid electrolytic capacitor element described in the section "Solid electrolytic capacitor element" may be included.

Figure 6:
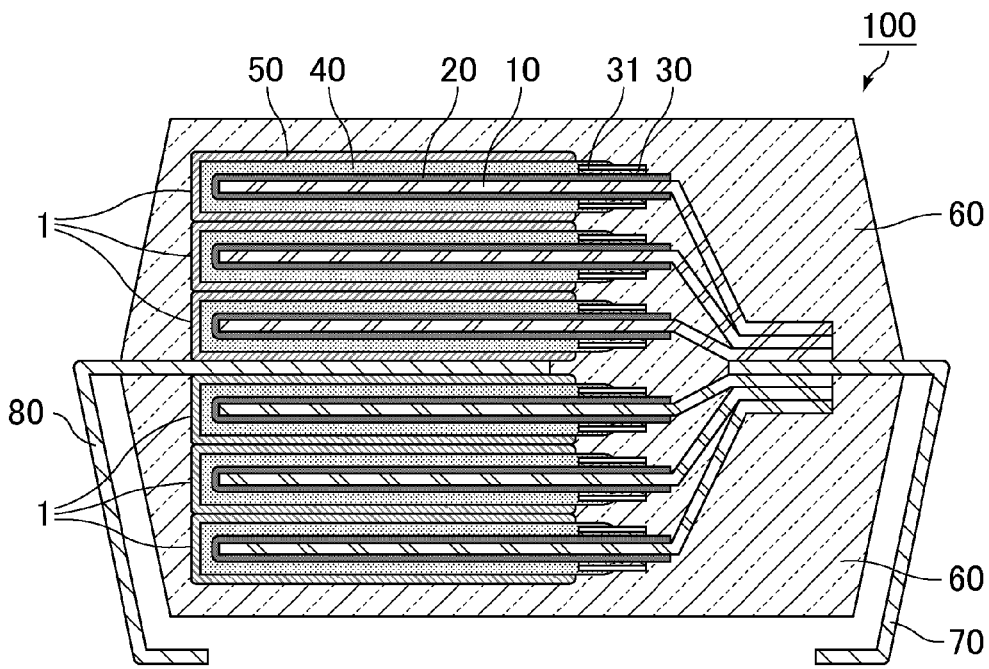
FIG. 6 is a schematic cross-sectional view of an example of a solid electrolytic capacitor according to preferred embodiments of the present invention.

FIG. 6 is a schematic cross-sectional view of an example of a solid electrolytic capacitor according to preferred embodiments of the present invention.

A solid electrolytic capacitor 100 illustrated in FIG. 6 includes solid electrolytic capacitor elements 1 (hereinafter may be simply referred to as capacitor elements 1), an anode terminal 70 (a lead frame on the anode side), a cathode terminal 80 (a lead frame on the cathode side), and a packaging resin 60.

The packaging resin 60 covers the entireties of the capacitor elements 1, part of the anode terminal 70, and part of the cathode terminal 80. An example of the material for the packaging resin 60 is an epoxy resin.

Method for Producing Solid Electrolytic Capacitor

A method for producing s solid electrolytic capacitor according to preferred embodiments of the present invention will now be described.

In the method for producing a solid electrolytic capacitor according to preferred embodiments of the present invention, solid electrolytic capacitor elements are prepared by the method described in the section "Method for producing solid electrolytic capacitor element", and the solid electrolytic capacitor elements are sealed with a packaging resin.

The solid electrolytic capacitor is preferably prepared as follows.

First, one or more solid electrolytic capacitor elements are prepared by the method described in the section "Method for producing solid electrolytic capacitor element".

In preparing a solid electrolytic capacitor that includes multiple solid electrolytic capacitor elements, solid electrolytic capacitor elements are stacked. In the process, the solid electrolytic capacitor elements are stacked so that the anode terminal regions of the valve metal substrates oppose each other. The anode terminal regions are joined with one another, and the anode terminal is joined to the anode terminal regions. Examples of the joining technique include welding and pressure bonding. The elements are also stacked so that portions that correspond to the current collector layers are in contact with each other, and the cathode terminal is joined to the current collector layers. As a result, the current collector layers become electrically coupled to one another. Coupling between the current collector layers and joining between current collector layers and the cathode terminal are done by using a conductive adhesive, for example.

Subsequently, sealing is performed with a packaging resin so that the packaging resin covers the entireties of the capacitor elements, part of the cathode terminal, and part of the anode terminal. The packaging resin is, for example, formed by transfer molding. As a result, a solid electrolytic capacitor is obtained.

EXAMPLES

Examples of specific disclosure of the solid electrolytic capacitor element and the solid electrolytic capacitor according to preferred embodiments of the present invention will now be described. It is to be understood that the present invention is not limited to the following examples.

Example 1

First, a chemically converted aluminum foil having a porous layer on its surfaces was prepared as a valve metal substrate, and cut into a predetermined shape.

Next, the masking member was applied to have a strip shape at a position a particular distance away from one end of the chemically converted aluminum foil in the long axis direction so that the masking member extended all around the chemically converted aluminum foil. As a result, the masking member penetrated the porous layer and formed the masking region. In the chemically converted aluminum foil divided by the masking region, the region that contained the small-area portion and the masking region was assumed to be the anode terminal region, and the region other than this region was assumed to be the cathode-forming region. A polyimide was used as the material for the masking member.

The masking region had a width of 0.7 mm and a height of 10 μm.

The chemically converted aluminum foil having the masking region formed therein was oxidized in an aqueous ammonium adipate solution to form an aluminum oxide dielectric layer on cut ends.

A silane coupling agent, 3-glycidyloxypropyltrimethoxysilane, was applied to the cathode-forming-region-side half of the masking member that constituted the masking region so as to form a hydrophilic region that included a hydrophilic member.

Then the entirety of the cathode-forming region and the entirety of the hydrophilic region among the masking region (the cathode-forming-region-side half of the masking member) was immersed in the conductive polymer-containing solution. A PEDOT:PSS dispersion (mixed dispersion containing poly(3,4-ethylenedioxythiophene) and polystyrene sulfonic acid) was used as the conductive polymer-containing solution. After immersing, the foil was dried to form a solid electrolyte layer on the entirety of the cathode-forming region and the entirety of the hydrophilic region.

The cathode-forming region in the surface of the solid electrolyte was immersed in carbon paste, followed by drying so as to form a carbon layer. The surface of the carbon layer was immersed in silver paste, followed by drying to form a silver layer. As a result, a solid electrolytic capacitor element was prepared.

Four such solid electrolytic capacitor elements were stacked, exposed portions of the valve metal substrates were joined to an external coupling terminal (anode terminal) by resistance welding, and the silver layers were joined to another external coupling terminal (cathode terminal) with a conductive adhesive. Then sealing was carried out using a packaging resin so as to obtain a solid electrolytic capacitor of Example 1. The obtained solid electrolytic capacitor was about 7.3 mm in length, about 4.3 mm in width, and about 1.9 mm in thickness.

Example 2

Capacitor elements were prepared as in Example 1 except that the silane coupling agent was changed to 3-aminopropyltrimethoxysilane. As a result, a solid electrolytic capacitor of Example 2 was obtained.

Example 3

Capacitor elements were prepared as in Example 1 except that the silane coupling agent was changed to a metal chelating agent, 8-quinolinol. As a result, a solid electrolytic capacitor of Example 3 was obtained.

Example 4

Capacitor elements were prepared as in Example 1 except that the silane coupling agent was changed to a metal chelating agent, 1,2,3-benzotriazole. As a result, a solid electrolytic capacitor of Example 4 was obtained.

Example 5

Capacitor elements were prepared as in Example 1 except that the silane coupling agent was changed to a metal chelating agent, 1,3-diphenyl-1,3-propanedione. As a result, a solid electrolytic capacitor of Example 5 was obtained.

Example 6

Capacitor elements were prepared as in Example 1 except that the silane coupling agent was changed to a wetting agent (Carbowet 106 produced by Air Products and Chemicals, Inc.). As a result, a solid electrolytic capacitor of Example 6 was obtained.

Comparative Example 1

Capacitor elements were prepared as in Example 1 except that no hydrophilic region was formed in the masking region. As a result, a solid electrolytic capacitor of Comparative Example 1 was obtained.

Evaluation of Non-Defective Rate

One thousand solid electrolytic capacitors of each of Examples 1 to 6 and Comparative Example 1 were prepared, and their leak current was evaluated. The capacitors that had leak current of 0.1 CV or more were assumed to be defective in determining the non-defective rate. The results are shown in Table 1.

TABLE 1

| | Hydrophilic member | | Non-defective rate |
|---|---|---|---|
| Example 1 | Silane coupling agent | 3-Glycidyloxy-propyl-trimethoxysilane | 92.3% |
| Example 2 | Silane coupling agent | 3-Aminopropyl-trimethoxysilane | 93.0% |
| Example 3 | Metal chelating agent | 8-Quinolinol | 93.3% |
| Example 4 | Metal chelating agent | 1,2,3-Benzotriazole | 93.7% |
| Example 5 | Metal chelating agent | 1,3-Diphenyl-1,3-propanedione | 95.1% |
| Example 6 | Wetting agent | Carbowet 106 | 93.7% |
| Comparative Example 1 | None | — | 85.3% |

Table 1 shows that solid electrolytic capacitors of all Examples in which a hydrophilic region was formed in the masking region had higher non-defective rates regarding leak current than the solid electrolytic capacitor of Comparative Example 1 in which no hydrophilic region is provided.

While preferred embodiments of the invention have been described above, it is to be understood that variations and modifications will be apparent to those skilled in the art without departing from the scope and spirit of the invention. The scope of the invention, therefore, is to be determined solely by the following claims.

What is claimed is:

1. A solid electrolytic capacitor element comprising:
   a valve metal substrate that has an anode terminal region and a cathode-forming region;
   a dielectric layer on the cathode-forming region;
   a solid electrolyte layer on the dielectric layer;
   a current collector layer on the solid electrolyte layer;
   a masking member between the anode terminal region and the cathode-forming region and insulating the valve metal substrate from opposite polarity; and
   a hydrophilic member on a surface of the masking member.

2. The solid electrolytic capacitor element according to claim 1, wherein the hydrophilic member contains at least one selected from the group consisting of a silane coupling agent, a metal chelating agent, and a wetting agent.

3. The solid electrolytic capacitor element according to claim 1, wherein the hydrophilic member contains a silane coupling agent, and the silane coupling agent is at least one selected from 3-glycidyloxypropyltrimethoxysilane and 3-aminopropyltrimethoxysilane.

4. The solid electrolytic capacitor element according to claim 1, wherein the hydrophilic member contains a metal chelating agent, and the metal chelating agent is at least one selected from 8-quinolinol, 1,2,3-benzotriazole, and 1,3-diphenyl-1,3-propanedione.

5. The solid electrolytic capacitor element according to claim 1, wherein at least a portion of the solid electrolyte layer is on the hydrophilic member, and the at least a portion of the solid electrolyte layer is not covered with the current collector layer.

6. The solid electrolytic capacitor element according to claim 1, wherein an entirety of the solid electrolyte layer that is on the dielectric layer in the cathode-forming region is covered with the current collector layer.

7. The solid electrolytic capacitor element according to claim 1, wherein the masking member has a height of 50 μm or less.

8. A solid electrolytic capacitor comprising:
the solid electrolytic capacitor element according to claim 1; and
a packaging resin that seals the solid electrolytic capacitor element.

9. A method for producing a solid electrolytic capacitor element, the method comprising:
forming a dielectric layer on a valve metal substrate;
forming a masking member on the valve metal substrate so as to partition the valve metal substrate into an anode terminal region and a cathode-forming region;
forming a hydrophilic member on a surface of the masking member;
forming a solid electrolyte layer on at least part of the hydrophilic member and on the dielectric layer; and
forming a current collector layer on the solid electrolyte layer.

10. The method according to claim 9, wherein the hydrophilic member contains at least one selected from a silane coupling agent, a metal chelating agent, and a wetting agent.

11. The method according to claim 9, wherein the hydrophilic member contains a silane coupling agent, and the silane coupling agent is at least one selected from 3-glycidyloxypropyltrimethoxysilane and 3-aminopropyltrimethoxysilane.

12. The method according to claim 9, wherein the hydrophilic member contains a metal chelating agent, and the metal chelating agent is at least one selected from 8-quinolinol, 1,2,3-benzotriazole, and 1,3-diphenyl-1,3-propandedione.

13. The method according to claim 9, wherein, when forming the current collector layer, the solid electrolyte layer formed on the at least part of the hydrophilic member is not covered with the current collector layer.

14. The method according to claim 9, wherein, when forming the current collector layer, an entirety of the solid electrolyte layer within the cathode-forming region is covered with the current collector layer.

15. The method according to claim 9, wherein the masking member is formed so as to have a height of 50 μm or less.

16. A method for producing a solid electrolytic capacitor, the method comprising:
preparing a solid electrolytic capacitor by:
forming a dielectric layer on a valve metal substrate;
forming a masking member on the valve metal substrate so as to partition the valve metal substrate into an anode terminal region and a cathode-forming region;
forming a hydrophilic member on a surface of the masking member;
forming a solid electrolyte layer on at least part of the hydrophilic member and on the dielectric layer; and
forming a current collector layer on the solid electrolyte layer; and
sealing the solid electrolytic capacitor element with a packaging resin.

17. The method according to claim 16, wherein the hydrophilic member contains at least one selected from a silane coupling agent, a metal chelating agent, and a wetting agent.

18. The method according to claim 16, wherein, when forming the current collector layer, the solid electrolyte layer formed on the at least part of the hydrophilic member is not covered with the current collector layer.

19. The method according to claim 16, wherein, when forming the current collector layer, an entirety of the solid electrolyte layer within the cathode-forming region is covered with the current collector layer.

20. The method according to claim 16, wherein the masking member is formed so as to have a height of 50 μm or less.

* * * * *